United States Patent
Goto et al.

(10) Patent No.: US 6,903,297 B2
(45) Date of Patent: Jun. 7, 2005

(54) WIRE ELECTRIC-DISCHARGE MACHINING METHOD AND DEVICE

(75) Inventors: Akihiro Goto, Tokyo (JP); Taichiro Tamida, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/471,863

(22) PCT Filed: Jun. 15, 2001

(86) PCT No.: PCT/JP01/05133

§ 371 (c)(1),
(2), (4) Date: Sep. 15, 2003

(87) PCT Pub. No.: WO02/102538

PCT Pub. Date: Dec. 27, 2002

(65) Prior Publication Data

US 2004/0094515 A1 May 20, 2004

(51) Int. Cl.$^7$ .............................. B23H 7/04; B23H 7/02
(52) U.S. Cl. .................. 219/69.12; 219/69.12; 219/69.18
(58) Field of Search ........................ 219/69.12, 69.13, 219/69.14, 69.18, 69.17

(56) References Cited

U.S. PATENT DOCUMENTS 6,130,395 A * 10/2000 Kaneko et al. .......... 219/69.12
6,756,557 B1 * 6/2004 Ukai et al. ................ 219/69.13

FOREIGN PATENT DOCUMENTS

| JP | 61-164718 A | * | 7/1986 |
| JP | 6-339815 A | | 12/1994 |
| JP | 52-11073 B2 | * | 3/1997 |
| JP | 9-239622 A | | 9/1997 |
| JP | 2001-105239 A | | 4/2001 |
| WO | WO-02/34444 A1 | * | 5/2002 |

OTHER PUBLICATIONS

U.S. Appl. No. 10/069,504, filed Feb. 27, 2002, Akihiro Goto et al.
U.S. Appl. No. 10/048,571, filed Feb. 4, 2002, Akihiro Goto et al.
U.S. Appl. No. 10/148,545, filed Jun. 4, 2002, Seiji Satou et al.
Improvement of Accuracy of Second–Cut using Dry WEDM; Written by Adachi, Furutachi and Kunieda, Shaping technology, vol. 14, No. 7 (1999) P. 154–155.
Dry Electrical Discharge Machining; Written by Kunieda and Yoshida, Journal of The Japan Society for Precision Engineering, vol. 64, No. 12 (1998( P. 1735–1738.
Micro–Machining by EDM is Gas; Written by Yoshida and Kunieda, Collected papers of Japan society of Electrical–Machining Engineers national convention (1996) P. 77–80.

* cited by examiner

*Primary Examiner*—Geoffrey S. Evans
(74) *Attorney, Agent, or Firm*—Sughrue Mion, PLLC

(57) ABSTRACT

A wire electrical discharge machining apparatus for machining a workpiece (2) by supplying discharge energy to a gap between a wire electrode (1a) and the workpiece (2) by a working-electric-power source (16) having a dc power supply (17) and switches (19a, 19b, 19c, and 19d) for switching an output voltage of the dc power supply (17), and by relatively moving the wire electrode (1a) and the workpiece (2) by a positioning device that includes: a controller (20) which, during machining in a gas, controls the turning on and off of the switches (19a, 19b, 19c, and 19d) so that the voltage is set to reverse polarity whereby the polarity of the wire electrode (1a) is made positive and the polarity of the workpiece (2) is made negative.

4 Claims, 7 Drawing Sheets

WIRE ELECTRIC-DISCHARGE MACHINING METHOD AND DEVICE

TECHNICAL FIELD

The present invention relates to improvements of a method of and an apparatus for wire electrical discharge machining for machining a workpiece by generating electric discharge across a gap between a wire electrode and the workpiece.

BACKGROUND ART

Electric discharge machining has established a solid position as a machining technology for such as dies and molds, and has been extensively used in the field of die and mold machining in the automobile industry, the household electrical appliance industry, the semiconductor industry, and the like.

Figure 5:
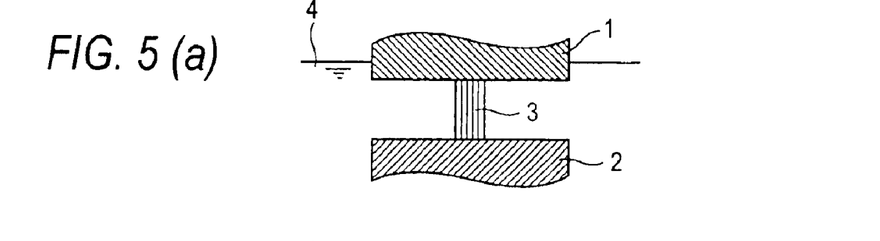
FIG. 5 is an explanatory diagram of a mechanism of electrical discharge machining.

FIG. 5 is an explanatory diagram of the mechanism of electrical discharge machining. In the drawing, reference numeral 1 denotes an electrode; 2, a workpiece; 3, an arc column; 4, a working liquid; and 5, machining debris produced in electrical discharge machining. Removal machining based on the electric discharge in the workpiece 2 progresses while repeating the cycle of the following steps (a) to (e) (corresponding to steps (a) to (e) in FIG. 5): Namely, these steps are (a) the formation of the arc column 3 due to the generation of electrical discharge, (b) the local fusion and the vaporization of the working liquid 4 due to the thermal energy of electric discharge, (c) the generation of an explosive force of vaporization of the working liquid 4, (d) the scattering of fused portions (machining debris 5), and (e) cooling, solidification, and recovery of insulation in the gap between the electrode 1 and the workpiece 2 due to the working liquid.

This invention concerns wire electrical discharge machining which is used in boring, cutting, and the like in electrical discharge machining which effects removal machining of a workpiece by heating and fusing the workpiece by pulse-like discharges. In particular, there has been a growing demand for higher precision in the wire electrical discharge machining, and high machining accuracy on the order of 1 to 2 $\mu$m or thereabouts has come to be required in the machining of high-precision dies and molds used in the semiconductor industry and the like.

Figure 6:
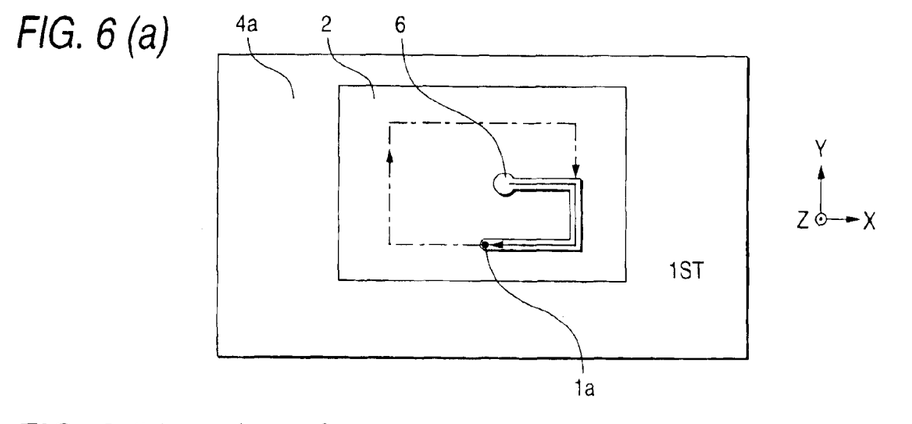
FIG. 6 is an explanatory diagram illustrating an example of the machining process of wire electrical discharge machining.

FIG. 6 is an explanatory diagram illustrating an example of the machining process of wire electrical discharge machining. In the drawing, reference numeral 1a denotes a wire electrode; 2, the workpiece; 4a, water, i.e., a working liquid; and 6, an initial hole. The part (a) of FIG. 6 shows the state of a first cut which is rough machining, the part (b) of FIG. 6 shows the state of a second cut which is semi-finish machining after rough machining, and the part (c) of FIG. 6 shows the state of a third cut which is final finish machining.

The example of the machining of the first cut in the part (a) of FIG. 6 shows machining in which the wire electrode 1a is passed through the initial hole 6, and the workpiece 2 is bored. In the case of such a first cut, since the surface roughness and accuracy of the machined surfaces of the workpiece are finished in subsequent machining, very strict surface roughness and accuracy are not required so much, and it is important to increase the machining speed, in particular, so as to improve productivity. In wire electrical discharge machining, in order to increase the machining speed, the water 4a is powerfully sprayed to the gap between the wire electrode 1a and the workpiece 2 so as to efficiently discharge the machining debris from the gap. In addition, in order to eliminate the unevenness of the application of the water 4a to the gap and prevent the disconnection of the wire electrode 1a, a method is adopted in which the water 4a stored in an unillustrated working tank and the workpiece 2 is immersed in it.

In the above-described conventional wire electrical discharge machining, the machining after the first cut (the part (a) in FIG. 6), such as the second cut (the part (b) in FIG. 6) and the third cut (the part (c) in FIG. 6), is also effected in the water 4a, i.e., the working fluid.

Figure 7:
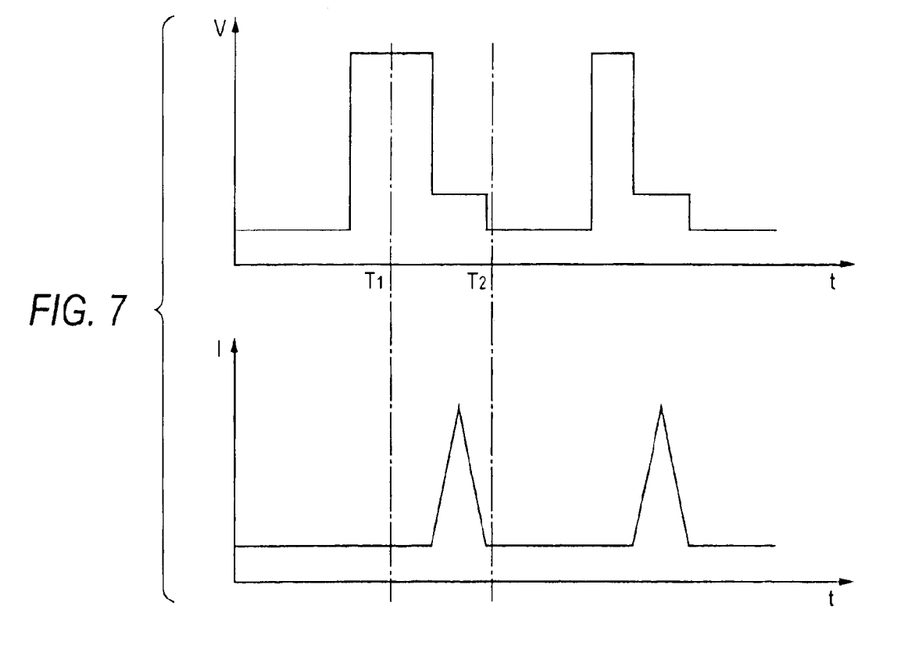
FIG. 7 is a diagram illustrating examples of the voltage and the current waveform in the gap between the wire electrode and the workpiece.

FIG. 7 shows examples of the voltage and the current waveform in the gap between the wire electrode 1a and the workpiece 2. In the drawing, V denotes a gap voltage; I, a gap current; and t, time. The state at a timing T1 in FIG. 7 is a state in which the voltage is applied across the gap. When a voltage is applied across the gap, a force acts in which the positive polarity and the negative polarity are attracted toward each other, so that the wire electrode 1a having small rigidity is pulled toward the workpiece 2 side by this electrostatic force. This causes the vibration of the wire electrode 1a, so that there has been a problem in that high-accuracy machining is made difficult due to such vibration.

In addition, the state at a timing T2 in FIG. 7 is a state in which the explosive force of vaporization of the working liquid has been generated due to the discharge energy (e.g., the part (c) in FIG. 5), wherein a large force acts on the wire electrode 1a in a direction opposite to that of the workpiece 2 due to the explosive force of vaporization of the working liquid, so that vibrations occur. There has been a problem in that irregularities occur in the shape of the workpiece 2 due to such vibrations, which leads to the deterioration of the accuracy.

In the semiconductor industry and the like, which are the fields of application of wire electrical discharge machining, in the machining of such as a die for IC leadframes, applications are increasing in which extremely high accuracy and very smooth surface roughness are required for workpieces whose form accuracy is 1 $\mu$m and whose surface roughness is 1 $\mu$m Rmax or less. In such uses, in particular, the above-described problem ascribable to the vibration and the like of the wire electrode has been noticeable.

As a measure for overcoming such problems of wire electrical discharge machining in such a working liquid, a technique concerning aerial wire electrical discharge machining has been disclosed in which wire electrical discharge machining is performed in the atmosphere without a working liquid interposed in the gap between the wire electrode and the workpiece (Adachi, Tokyo University of Agriculture and Technology, et al.: "Attaining High Precision in Second Cuts by Aerial EDM," Die & Mold Technology, Vol. 14, No. 7, 1999, p. 154, The Nikkan Kogyo Shimbun, Ltd.). However, although it is disclosed that accuracy in the straightness of cut surfaces of workpieces is improved by wire electrical discharge machining in the atmosphere, no disclosure is given of a specific configuration and the like concerning a measure for coping with applications in which higher accuracy is required and applications in which high quality of the workpiece surface is required.

DISCLOSURE OF THE INVENTION

This invention has been devised to overcome the above-described problems, and its object is to provide a method of and an apparatus for wire electrical discharge machining which are suitable for high-accuracy machining and high-quality machining.

The method of wire electrical discharge machining in accordance with this invention is a method of wire electrical discharge machining for machining a workpiece by generating electric discharge in a gap between a wire electrode and the workpiece, wherein machining is effected by supplying to the gap a voltage of reverse polarity in which the polarity of the wire electrode is made positive and the polarity of the workpiece is made negative, in the atmosphere or while supplying a pressure gas to the gap.

In addition, the method of wire electrical discharge machining in accordance with this invention is a method of wire electrical discharge machining for machining a workpiece by generating electric discharge in a gap between a wire electrode and the workpiece, comprising: a first step of effecting rough machining in a working fluid; and a second step of effecting finish machining in the atmosphere or while supplying a pressure gas to the gap, wherein, in the second step, machining is effected by supplying to the gap a voltage of reverse polarity in which the polarity of the wire electrode is made positive and the polarity of the workpiece is made negative.

The wire electrical discharge machining apparatus in accordance with this invention is a wire electrical discharge machining apparatus for machining a workpiece by supplying discharge energy to a gap between a wire electrode and the workpiece by working-electric-power supplying means having a dc power supply and switching means for switching an output voltage of the dc power supply, and by relatively moving the wire electrode and the workpiece by positioning means, comprising: controlling means which, during machining in the atmosphere or during machining effected while supplying a pressure gas to the gap by gas supplying means, controls the turning on and off of the switching means so as to apply to the gap a voltage of reverse polarity in which the polarity of the wire electrode is made positive and the polarity of the workpiece is made negative.

In addition, the wire electrical discharge machining apparatus in accordance with this invention is a wire electrical discharge machining apparatus for machining a workpiece by supplying discharge energy to a gap between a wire electrode and the workpiece by working-electric-power supplying means having a dc power supply and switching means for switching an output voltage of the dc power supply and capable of applying to the gap voltages of both normal and reverse polarities, and by relatively moving the wire electrode and the workpiece by positioning means, comprising: mean-voltage detecting means for detecting a mean voltage in the gap; and controlling means which, during machining in a working fluid, controls the turning on and off of the switching means so as to apply to the gap the voltage of reverse polarity in which the polarity of the wire electrode is made positive and the polarity of the workpiece is made negative and the voltage of normal polarity in which the polarity of the wire electrode is made negative and the polarity of the workpiece is made positive, and so as to set a value of a mean voltage in the gap detected by the mean-voltage detecting means to substantially 0 V, and which, during machining in the atmosphere or during machining effected while supplying a pressure gas to the gap by gas supplying means, controls the turning on and off of the switching means so as to apply to the gap a voltage of reverse polarity.

Since the method of and the apparatus for wire electrical discharge machining are arranged as described above, advantages are offered in that the surface roughness of the machined surface of the workpiece can be made smoother, and that it becomes possible to cope with applications in which higher accuracy is required and applications in which high quality of the workpiece surface is required.

BEST MODE FOR CARRYING OUT THE INVENTION

Figure 1:
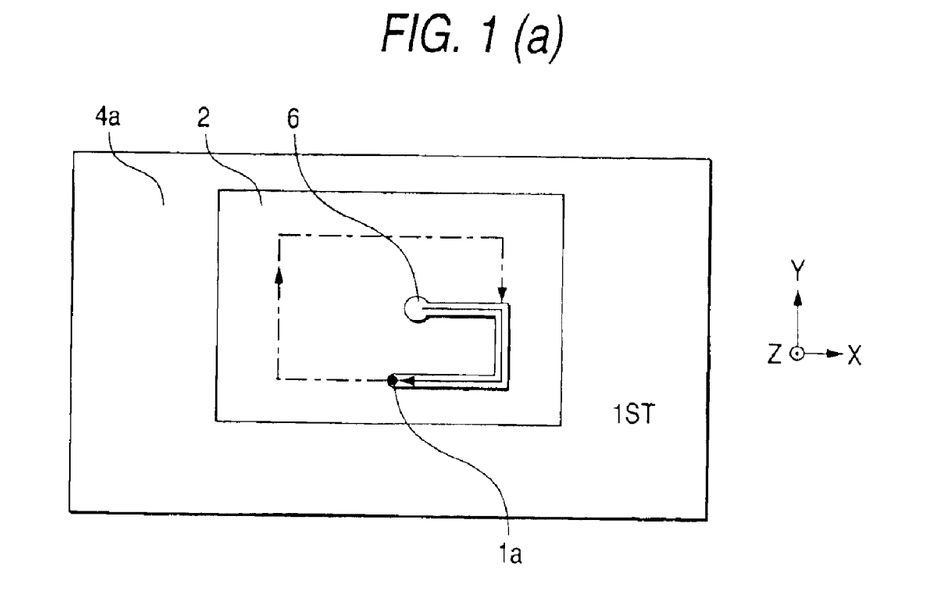
FIG. 1 is an explanatory diagram illustrating an example of a method of wire electrical discharge machining in accordance with an embodiment of this invention.

FIG. 1 is an explanatory diagram illustrating an example of a method of wire electrical discharge machining in accordance with an embodiment of this invention. In the drawing, reference numeral 1a denotes a wire electrode; 2, a workpiece; 4a, water, i.e., a working liquid; 6, an initial hole; and 7, a gas such as air., oxygen, nitrogen, hydrogen, an inert gas, an insulating gas, or the like. The part (a) of FIG. 1 shows a first cut which is rough machining, and the part (b) of FIG. 1 shows a second cut which is finish machining after the rough machining. The terms 'the first cut and the second cut' are for the sake of convenience, and it does not necessarily follow that wire electrical discharge machining is completed in two steps of machining. In machining in which the accuracy required for the workpiece is high, there are cases where machining is effected in as many as seven or eight steps.

Next, a description will be given of an outline of the machining method. The first cut shown in the part (a) of FIG. 1 is machining in which the wire electrode 1a is passed through the initial hole 6 and the wire electrical discharge machining 2 is bored. In the first cut, since the surface roughness and accuracy of the machined surfaces of the workpiece are finished in subsequent machining, strict surface roughness and accuracy are not required so much, and it is particularly important to increase the machining speed to improve productivity. In the same way as in FIG. 6 concerning the background art, machining is effected with the water 4a, i.e., the working fluid, interposed in the gap between the wire electrode 1a and the workpiece 2.

In ordinary wire electrical discharge machining, machining proceeds in the working fluid even after the first cut.

However, since there are problems in such as the vibration of the wire electrode 1a as shown in the background art, the ordinary wire electrical discharge machining is not suitable for high-accuracy machining.

In the second cut shown in the part (b) of FIG. 1, which is finish machining, machining is effected not in the working fluid 4a but in the gas 7 to suppress the vibration of the wire electrode 1a and improve the machining accuracy. It is possible to suppress the vibration and the like of the wire electrode 1a by such aerial wire electrical discharge machining, as shown below.

Namely, since the electrostatic force acting between the wire electrode 1a and the workpiece 2 when a voltage is applied across the gap is proportional to the dielectric constant of the gap, if a calculation is made under the assumption that the gap distance is the same, in the case where the interposed object in the gap is the gas 7, the electrostatic force becomes one-tenths (for example, the dielectric constant is the smallest in a vacuum, and in water it is about 80-fold that in the vacuum) as compared with the case where the interposed object in the gap is the water 4a. In addition, since the explosive force of vaporization due to the electric discharge is generated by the liquid interposed in the gap, in the case where only the gas 7 is present in the gap, the wire electrode 1a remains practically unaffected by the explosive force of vaporization. Accordingly, since the vibration and the like of the wire electrode 1a can be suppressed, the shape accuracy and surface roughness of the machined surfaces of the workpiece improve.

Figure 2:
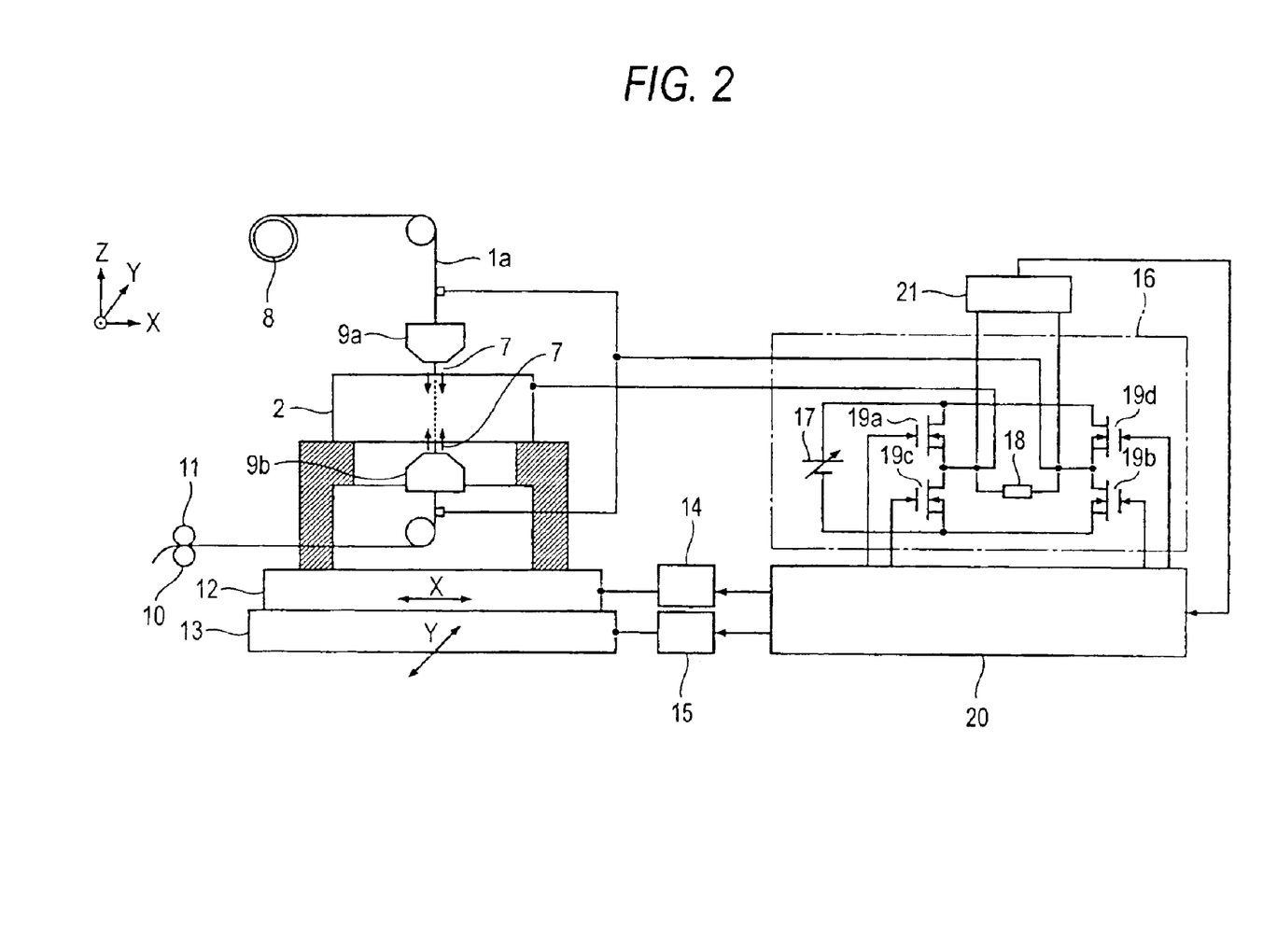
FIG. 2 is a block diagram illustrating the configuration of a wire electrical discharge machining apparatus in accordance with the embodiment of this invention.

FIG. 2 is an explanatory diagram illustrating the configuration of a wire electrical discharge machining apparatus in accordance with the embodiment of this invention, and illustrates an example of the configuration which is capable of realizing aerial wire electrical discharge machining such as the one shown in the part (b) of FIG. 1. In FIG. 2, reference numeral 1a denotes the wire electrode; 2, the workpiece; 7, a gas such as air, oxygen, nitrogen, hydrogen, an inert gas, an insulating gas, or the like; and 8, a wire bobbin. Numerals 9a and 9b denote gas supplying means for supplying the gas 7 to the gap between the wire electrode 1a and the workpiece 2. Numeral 10 denotes a capstan roller; 11, a pinch roller; 12, an X table for driving the workpiece 2 in a horizontal direction (in the X direction); 13, a Y table for driving the workpiece 2 in a horizontal direction (in the Y direction); 14, an X-axis servo amplifier for controlling an unillustrated drive motor for driving the X table 12; 15, a Y-axis servo amplifier for controlling an unillustrated drive motor for driving the Y table 13; 16, a working-electric-power supplying means; 17, a dc power supply for supplying a dc voltage to the gap between the wire electrode 1a and the workpiece 2; and 18, a gap resistor. Numerals 19a, 19b, 19c, and 19d denote switching means such as field effect transistors for effecting the switching of the dc voltage. Numeral 20 denotes a controlling means for effect the on-off control and the like of the switching means 19a, 19b, 19c, and 19d, and numeral 21 denotes a mean-voltage detecting means for detecting the mean voltage in the gap.

Next, a description will be given of the operation. The wire electrode 1a is clamped and pulled by the capstan roller 10 and the pinch roller 11 to cause the wire electrode 1a to travel, and the wire electrode 1a and the workpiece 2 are caused to oppose each other. While the gas 7 is being supplied to the gap between the wire electrode 1a and the workpiece 2 by the gas supplying means 9a and 9b, working electric power, i.e., the discharge energy, is supplied to the gap by the working-electric-power supplying means 16. The wire electrode 1a and the workpiece 2 are moved relative to each other by the X table 12, the Y table 13, and the like, which are the positioning means, to effect finish machining. Control of the relative positioning of the wire electrode 1a and the workpiece 2 by the positioning means, control of the electric machining conditions, and the like are administered by the controlling means 20. The gas supplying means 9a and 9b can be realized by, for example, such as supplying a pressure gas after forming nozzles around the wire electrode 1a. By supplying such a pressure gas to the gap, it is possible to prevent the machining debris removed by the discharge from adhering to the wire electrode and the work piece surfaces. In addition, aerial wire electrical discharge machining can also be effected in the atmosphere without using such gas supplying means 9a and 9b.

It suffices if in a state in which the water 4a, i.e., the working fluid, is stored in an unillustrated working tank used in wire electrical discharge machining in an ordinary working fluid, and the workpiece 2 is immersed in it, the first cut, which is rough machining, in the part (a) of FIG. 1 is effected. It then suffices if after the water 4a in the working tank is discharged, the second cut, which is finish machining, in the part (b) of FIG. 1 is effected in a gas by using the configuration of the wire electrical discharge machining apparatus such as the one shown in FIG. 2.

In addition, the wire electrical discharge machining apparatus in accordance with the embodiment of this invention adopts a switching circuit of a bridge formation which is capable of applying voltages of normal and reverse polarities to the gap between the wire electrode 1a and the workpiece 2, as shown in FIG. 2. Accordingly, if the switching means 19a and 19b are turned on and the switching means 19c and 19d are turned off by the controlling means 20, it is possible to apply to the gap a voltage of normal polarity in which the polarity of the wire electrode 1a is negative and the polarity of the workpiece 2 is positive. On the other hand, if the switching means 19c and 19d are turned on and the switching means 19a and 19b are turned off by the controlling means 20, it is possible to apply to the gap a voltage of reverse polarity in which the polarity of the wire electrode 1a is positive and the polarity of the workpiece 2 is negative.

Figure 3:
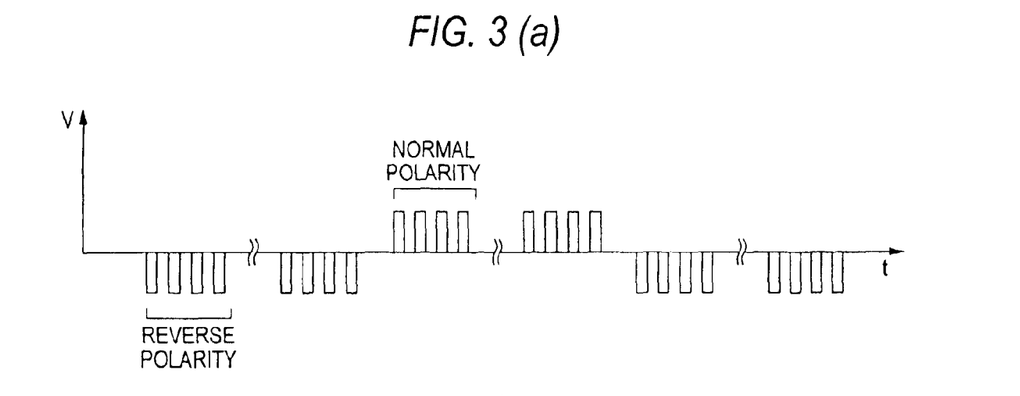
FIG. 3 is a diagram illustrating an example of the voltage waveform in the gap between a wire electrode and a workpiece in the wire electrical discharge machining apparatus in accordance with the embodiment of this invention.

FIG. 3 shows an example of the voltage waveform in the gap between the wire electrode 1a and the workpiece 2 in the wire electrical discharge machining apparatus in accordance with the embodiment of this invention. In the drawing, V denotes a gap voltage, and t denotes time.

The part (a) of FIG. 3 shows an example of the gap voltage waveform in a case where wire electrical discharge machining is effected with the water 4a, i.e., the working fluid, interposed in the gap. On-off control of the switching means 19a, 19b, 19c, and 19d is provided by the controlling means 20 shown in FIG. 2, thereby applying to the gap the voltage of reverse polarity in which the polarity of the wire electrode 1a is positive and the polarity of the workpiece 2 is negative and the voltage of normal polarity in which the polarity of the wire electrode 1a is negative and the polarity of the workpiece 2 is positive. In addition, the pulse widths of gap voltage pulses of both normal and reverse polarities are adjusted so that the value of the mean voltage in the gap detected by the mean-voltage detecting means 21 shown in FIG. 2 becomes substantially 0 V. Thus it is possible to suppress electrolytic corrosion in which ions of the electrode on the plus side are eluted into the fluid and corrosion progresses.

The part (b) of FIG. 3 shows an example of the gap voltage waveform in a case where wire electrical discharge machining is effected in the gas 7. On-off control of the switching means 19a, 19b, 19c, and 19d is provided by the controlling means 20 shown in FIG. 2, thereby effecting machining by the discharge with the reverse polarity. In the part (b) of FIG. 3, the mean voltage in the gap cannot be set substantially to 0 V as in the case of the part (a) of FIG. 3, but since the fluid is not present in the gap in the part (b) of FIG. 3, electrolytic corrosion does not occur.

In addition, the part (b) of FIG. 3 shows an example of a case in which large quiescent time is provided between groups of voltage pulses in the gap. However, this invention is not limited to such a case, and since the electrostatic force itself is small in aerial electrical discharge machining, it is also possible to set the quiescent time to be shorter.

Figure 4:
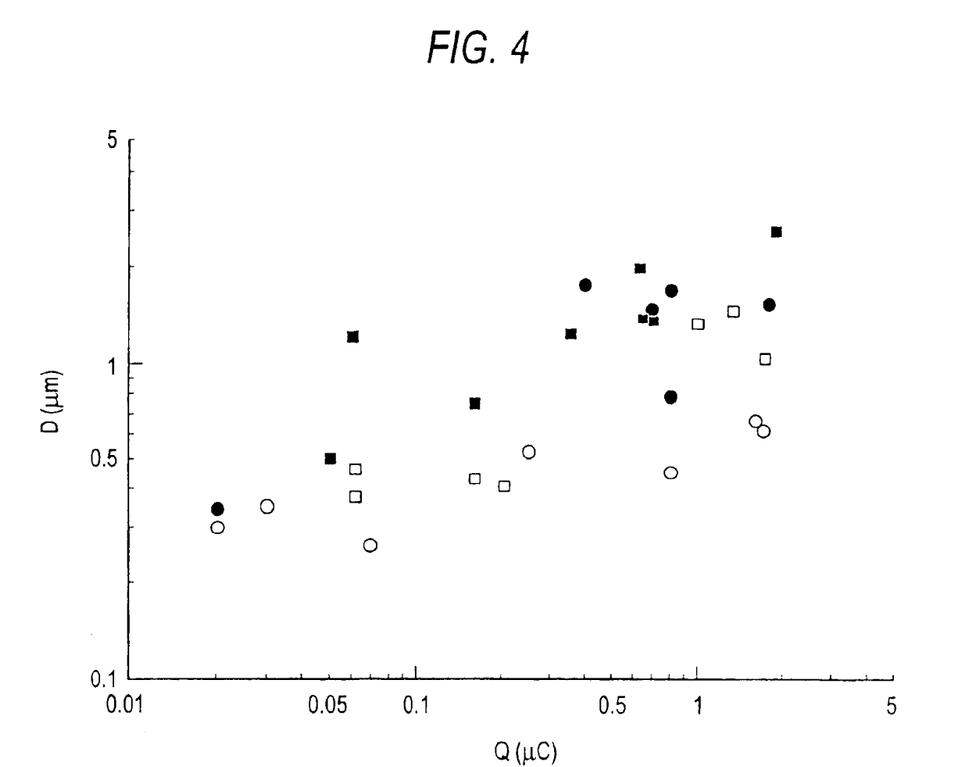
FIG. 4 is a diagram illustrating the results of an experiment which was conducted to make a comparison between wire electrical discharge machining in water and wire electrical discharge machining in the atmosphere and a comparison between wire electrical discharge machining with normal polarity and wire electrical discharge machining with reverse polarity.

FIG. 4 is a diagram illustrating the results of an experiment which was conducted to make a comparison between wire electrical discharge machining in water and wire electrical discharge machining in a gas and a comparison between wire electrical discharge machining with normal polarity and wire electrical discharge machining with reverse polarity. Q ($\mu$C) denotes the amount of charge transferred in a single discharge, and D ($\mu$m) denotes the depth of a discharge crater in the machined surface of the workpiece in the single discharge. The surface roughness of the machined surface of the workpiece is defined by the depth of the discharge crater.

As for the symbols in the drawing, ■ shows a case in which wire electrical discharge machining was performed with normal polarity in water; □, with reverse polarity in water; ●, with normal polarity in a gas; ○, with reverse polarity in a gas. These symbols show the results of measurement concerning a discharge crater formed in a single discharge. From FIG. 4, it can be appreciated that the amount of charge transferred and the depth of the discharge crater (i.e., the surface roughness of the machined surface of the workpiece) are strongly correlated to each other. From the observation of the craters of the single discharge, it can be understood that the discharge crater is smaller for □ than for ■, and that the discharge crater is smaller for ○ than for ●. Namely, it can be appreciated that, in the discharge of the same amount of charge, the discharge crater is smaller in the case of the reverse polarity than in the case of the normal polarity. In addition, it can also be understood that the discharge crater is the smallest in the case of ○ (reverse polarity; in a gas).

Accordingly, if aerial wire electrical discharge machining is effected by applying to the gap the voltage of reverse polarity in which the polarity of the wire electrode 1a is positive and the polarity of the workpiece 2 is negative, the surface roughness of the machined surface of the workpiece can be made smoothest.

Ordinary wire electrical discharge machining in water (corresponding to the part (a) in FIG. 1) is effected by the working-electric-power supplying means 16 capable of applying voltages of both normal and reverse polarities to the gap between the wire electrode 1a and the workpiece 2. In this case, the roughest discharge crater occurs in the case of the normal polarity in which the polarity of the wire electrode 1a is negative and the polarity of the workpiece 2 is positive. This irregularity becomes dominant with respect to the surface roughness of the machined surface of the workpiece. Then, if aerial wire electrical discharge machining (corresponding to the part (b) of FIG. 1) is effected by supplying to the gap the voltage of reverse polarity in which the polarity of the wire electrode 1a is positive and the polarity of the workpiece 2 is negative through on-off control of the switching means 19a, 19b, 19c, and 19d by the controlling means 20, it becomes possible to cope with such as applications in which higher accuracy is required or applications in which high quality of the workpiece surface is required.

Industrial Applicability

As described above, the method of and the apparatus for wire electrical discharge machining in accordance with this invention are particularly suitable for high-accuracy electrical discharge machining operation and high-quality electrical discharge machining operation.

What is claimed is:

1. A method of wire electrical discharge machining for machining a workpiece by generating electric discharge in a gap between a wire electrode and the workpiece, characterized in that machining is effected by supplying to the gap a voltage of reverse polarity in which the polarity of the wire electrode is made positive and the polarity of the workpiece is made negative, in the atmosphere or while supplying a pressure gas to the gap.

2. A method of wire electrical discharge machining for machining a workpiece by generating electric discharge in a gap between a wire electrode and the workpiece, characterized by comprising:

a first step of effecting rough machining in a working fluid; and a second step of effecting finish machining in the atmosphere or while supplying a pressure gas to the gap, wherein, in the second step, machining is effected by supplying to the gap a voltage of reverse polarity in which the polarity of the wire electrode is made positive and the polarity of the workpiece is made negative.

3. A wire electrical discharge machining apparatus for machining a workpiece by supplying discharge energy to a gap between a wire electrode and the workpiece by working-electric-power supplying means having a dc power supply and switching means for switching an output voltage of the dc power supply, and by relatively moving the wire electrode and the workpiece by positioning means, characterized by comprising:

controlling means which, during machining in the atmosphere or during machining effected while supplying a pressure gas to the gap by gas supplying means, controls the turning on and off of the switching means so as to apply to the gap a voltage of reverse polarity in which the polarity of the wire electrode is made positive and the polarity of the workpiece is made negative.

4. A wire electrical discharge machining apparatus for machining a workpiece by supplying discharge energy to a gap between a wire electrode and the workpiece by working-electric-power supplying means having a dc power supply and switching means for switching an output voltage of the dc power supply and capable of applying to the gap voltages of both normal and reverse polarities, and by relatively moving the wire electrode and the workpiece by positioning means, characterized by comprising:

mean-voltage detecting means for detecting a mean voltage in the gap; and controlling means which, during machining in a working fluid, controls the turning on and off of the switching means so as to apply to the gap the voltage of reverse polarity in which the polarity of the wire electrode is made positive and the polarity of the workpiece is made negative and the voltage of normal polarity in which the polarity of the wire electrode is made negative and the polarity of the workpiece is made positive, and so as to set a value of a mean voltage in the gap detected by the mean-voltage detecting means to substantially 0 V, and which, during machining in the atmosphere or during machining effected while supplying a pressure gas to the gap by gas supplying means, controls the turning on and off of the switching means so as to apply to the gap a voltage of reverse polarity.

* * * * *